US010205500B2

(12) United States Patent
Li et al.

(10) Patent No.: US 10,205,500 B2
(45) Date of Patent: Feb. 12, 2019

(54) DATA TRANSMISSION METHOD AND DATA TRANSMISIION DEVICE

(71) Applicant: CHINA ACADEMY OF TELECOMMUNICATIONS TECHNOLOGY, Beijing (CN)

(72) Inventors: Hui Li, Beijing (CN); Qiubin Gao, Beijing (CN); Runhua Chen, Beijing (CN); Wenhong Chen, Beijing (CN); Rakesh Tamrakar, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 0 days.

(21) Appl. No.: 15/751,460

(22) PCT Filed: Aug. 8, 2016

(86) PCT No.: PCT/CN2016/093996
§ 371 (c)(1),
(2) Date: Feb. 8, 2018

(87) PCT Pub. No.: WO2017/032220
PCT Pub. Date: Mar. 2, 2017

(65) Prior Publication Data
US 2018/0241449 A1 Aug. 23, 2018

(30) Foreign Application Priority Data
Aug. 24, 2015 (CN) .......................... 2015 1 0524778

(51) Int. Cl.
*H04B 7/04* (2017.01)
*H04B 7/0456* (2017.01)
*H04B 7/06* (2006.01)

(52) U.S. Cl.
CPC ......... *H04B 7/0486* (2013.01); *H04B 7/0473* (2013.01); *H04B 7/0478* (2013.01); *H04B 7/0617* (2013.01); *H04B 7/0639* (2013.01)

(58) Field of Classification Search
CPC .. H04B 7/0486; H04B 7/0473; H04B 7/0617; H04B 7/0639
See application file for complete search history.

(56) References Cited

U.S. PATENT DOCUMENTS 9,667,328 B2 * 5/2017 Xin ...................... H04B 7/0478
2014/0098689 A1 4/2014 Lee et al.
(Continued)

FOREIGN PATENT DOCUMENTS

CN 103152140 A 6/2013
CN 103957041 A 7/2014
(Continued)

OTHER PUBLICATIONS

International Search Report for PCT/CN2016/093996, dated Oct. 31, 2016, and its English translation provided by WIPO.
(Continued)

*Primary Examiner* — Jean B Corrielus
(74) *Attorney, Agent, or Firm* — Ladas & Parry, LLP (57) ABSTRACT

A precoding matrix determination method and a precoding matrix determination device are provided. The precoding matrix determination method includes: dividing each of the groups of vertical-dimension beams into a plurality of subgroups of vertical-dimension beams, and dividing each of the groups of horizontal-dimension beams into a plurality of subgroups of horizontal-dimension beams; determining a first stage codebook in accordance with a Kronecker product of each subgroup of vertical-dimension beams acquired by dividing each of the groups of vertical-dimension beams and each subgroup of horizontal-dimension beams acquired by (Continued)

dividing each of the groups of horizontal-dimension beams; and selecting a plurality of columns of beams from the determined first stage codebook using a second stage codebook, and performing phase adjustment to determine a precoding matrix.

12 Claims, 2 Drawing Sheets

(56) References Cited

U.S. PATENT DOCUMENTS

| | | | |
|---|---|---|---|
| 2014/0177745 A1 | 6/2014 | Krishnamurthy et al. | |
| 2015/0365150 A1* | 12/2015 | Kim | H04B 7/0417 375/267 |
| 2016/0149630 A1* | 5/2016 | Liu | H04B 7/0417 370/329 |
| 2016/0204842 A1 | 7/2016 | Song et al. | |

FOREIGN PATENT DOCUMENTS

| | | |
|---|---|---|
| CN | 104506281 A | 4/2015 |
| WO | 2014052806 A1 | 4/2014 |
| WO | 2015042986 A1 | 4/2015 |

OTHER PUBLICATIONS

Written Opinion of the International Search Authority for PCT/CN2016/093996, dated Oct. 31, 2016, and its English translation provided by Bing.com Microsoft Translator.

Written Opinion of the International Search Authority for PCT/CN2016/093996, dated Oct. 31, 2016, and its English translation provided by WIPO.

International Preliminary Report on Patentability (IPRP; Ch. 1) for PCT/CN2016/093996 dated Mar. 8, 2018 with English translation provided by WIPO.

From EP 16838480.8, European Search Report and Search Opinion dated Aug. 6, 2018.

R1-153817—Alcatel-Lucent Shanghai Bell, Proposals of 2D Codebook Design for 3D MIMO; 3GPP TSG RAN WG1 Meeting #82; Beijing, China, Aug. 24-28, 2015; pp. 1-8.

R1-154277—LG Electronics, "Discussion on codebook design options for EBF/FD-MIMO"; 3GPP TSG RAN WG1 Meeting #82; Beijing, China, Aug. 24-28, 2015; pp. 1-9.

* cited by examiner

DATA TRANSMISSION METHOD AND DATA TRANSMISIION DEVICE

CROSS-REFERENCE TO RELATED APPLICATION

The present application is the U.S. national phase of PCT Application No. PCT/CN2016/093996 filed on Aug. 8, 2016, which claims priority to the Chinese patent application No. 201510524778.7 filed on Aug. 24, 2015, which are hereby incorporated by reference in their entireties.

TECHNICAL FIELD

The present disclosure relates to the field of communication technology, in particular to a precoding matrix determination method and a precoding matrix determination device.

BACKGROUND

For a Long Term Evolution (LTE) system, a preceded codebook is generated in accordance with Discrete Fourier Transformation (DFT) vector, and a two-stage codebook structure is adopted. Taking an 8-antenna codebook in Release 12 (Rel-12) as an example, for a first stage codebook, a base station (evolved Node B (eNB)) determines a subset of DFT beam vectors in accordance with a Preceding Matrix Indicator (PMI) 1 fed back by a User Equipment (UE), and this PMI 1 is just an index in a set containing all the subsets of beam vectors. The UE then feeds back the PMI 1 to the base station (eNB). For a second stage codebook, the eNB performs column selection on the determined subset of beam vectors in accordance with a PMI 2 fed back by the UE, so as to select one or more columns of beam vectors therefrom and preform phase adjustment between polarization directions. Next, the eNB generates a final precoding matrix in accordance with the PMI 1 and the PMI 2 from the UE for downlink data transmission.

Along with the development of the antenna technology, an active antenna has been proposed so as to individually control each element. Through this design, the antenna array is provided with a two-dimensional (2D) structure arranged in both a horizontal direction and a vertical direction, rather than being arranged merely in the horizontal direction. This antenna array with the 2D structure is called as a three-dimensional (3D) Multiple-Input Multiple-Output (MIMO) antenna array.

There are various schemes for the design of a codebook for the 3D MIMO antenna array, and one of them lies in the extension on the basis of the 8-antenna codebook in Rel-12.

To be specific, for the first stage codebook, a subset of DFT beam vectors is acquired through a Kronecker product of a subset of vertical-dimension beam vectors and a subset of horizontal-dimension beam vectors, and for the second stage codebook, a subset of DFT beam vectors is acquired through column selection and phase adjustment on the subset of beam vectors acquired for the first stage codebook. There exist the following two column selection modes for the second stage codebook.

In a first column selection mode, multiple columns of vertical-dimension beams and multiple columns of horizontal-dimension beams are selected from a group of vertical-dimension beams and a group of horizontal-dimension beams of the subset of beam vectors acquired for the first stage codebook respectively. Next, a Kronecker product may be calculated in accordance with the selected columns of horizontal-dimension beams and the selected columns of vertical-dimension beams. Next, the phase adjustment is performed in accordance with the result. This column selection mode is equivalent to a mode where the second stage codebook also meets the Kronecker product. Each group of beams is acquired by dividing the subset of beam vectors.

In a second column selection mode, it is unnecessary to differentiate the vertical-dimension beams and the horizontal-dimension beams. Instead, each beam vector in the subset of beam vectors acquired for the first stage codebook is considered as a whole, and the phase adjustment is performed on multiple columns of beams selected from the subset of beam vectors. In the case that a Rank Indicator (RI) of the precoding matrix is greater than 1, it is impossible for the second stage codebook acquired in this column selection mode to meet a Kronecker product structure. However, each of the selected columns of beam vectors meets the Kronecker product structure, which is also called as a partial Kronecker product structure.

In the codebook for the 3D MIMO antenna array in the related art, the first stage codebook has a complete Kronecker product structure, and the number of the beams is a product of the number of the beams in the group of vertical-dimension beams and the number of the beams in the group of horizontal-dimension beams. In the case that there are a plurality of beams in the group of vertical-dimension beams and a plurality of beams in the group of horizontal-dimension beams, a relatively large product is acquired. In other words, the first stage codebook includes a large number of beams, resulting in a plurality of combinations during the column selection for the second stage codebook, i.e., a large number of codebooks based on which the second stage codebook is selected. A feedback period of the second stage codebook is short, so a feedback overhead may increase due to the large number of codebooks.

SUMMARY

An object of the present disclosure is to provide a precoding matrix determination method and a precoding matrix determination device, so as to solve the problem in the codebook for the 3D MIMO antenna array where the second stage codebook is selected on the basis of a large number of codebooks in the case that the first stage codebook has the complete Kronecker product structure and thereby the feedback overhead for the second stage codebook increases.

In one aspect, the present disclosure provides in some embodiments a precoding matrix determination method, including steps of: determining vertical-dimension beam vectors and horizontal-dimension beam vectors, dividing the vertical-dimension beam vectors into a plurality of groups of vertical-dimension beams, and dividing the horizontal-dimension beam vectors into a plurality of groups of horizontal-dimension beams, every two adjacent groups of vertical-dimension beams including at least one vertical-dimension beam not overlapping the other vertical-dimension beams, and every two adjacent groups of horizontal-dimension beams including at least one horizontal-dimension beam not overlapping the other horizontal-dimension beams; dividing each of the groups of vertical-dimension beams into a plurality of subgroups of vertical-dimension beams, and dividing each of the groups of horizontal-dimension beams into a plurality of subgroups of horizontal-dimension beams, the number of the subgroups of vertical-dimension beams acquired by dividing any one of the groups of vertical-dimension beams being identical to the number of the subgroups of horizontal-dimension beams acquired by dividing any one of the groups of horizontal-dimension beams; determining a first stage codebook in accordance with a Kronecker product of each subgroup of vertical-dimension beams acquired by dividing each of the groups of vertical-dimension beams and each subgroup of horizontal-dimension beams acquired by dividing each of the groups of horizontal-dimension beams; and selecting a plurality of columns of beams from the determined first stage codebook using a second stage codebook, and performing phase adjustment to determine a precoding matrix.

In a possible embodiment of the present disclosure, each of the groups of vertical-dimension beams includes an identical number of vertical-dimension beams, and each of the groups of horizontal-dimension beams includes an identical number of horizontal-dimension beams.

In a possible embodiment of the present disclosure, the subgroups of vertical-dimension beams acquired by dividing each of the groups of vertical-dimension beams do not overlap each other, and the subgroups of horizontal-dimension beams acquired by dividing each of the groups of horizontal-dimension beams do not overlap each other.

In a possible embodiment of the present disclosure, the step of determining the first stage codebook in accordance with the Kronecker product of each subgroup of vertical-dimension beams acquired by dividing each of the groups of vertical-dimension beams and each subgroup of horizontal-dimension beams acquired by dividing each of the groups of horizontal-dimension beams includes: determining a first matrix $X_1=[X_{v,1} \otimes X_{h,1} \ X_{v,2} \otimes X_{h,2} \ldots X_{v,q} \otimes X_{h,q} \ldots X_{v,Q} \otimes X_{h,Q}]$ in accordance with the Kronecker product of each subgroup of vertical-dimension beams acquired by dividing each of the groups of vertical-dimension beams and each subgroup of horizontal-dimension beams acquired by dividing each of the groups of horizontal-dimension beams, where $X_{v,q}$ represents a $q^{th}$ subgroup of vertical-dimension beams of a group $X_v$ of vertical-dimension beams, and $X_{h,q}$ represents a $q^{th}$ subgroup of horizontal-dimension beams of a group $X_h$ of horizontal-dimension beams: determining a second matrix $X_2$ in accordance with each subgroup of vertical-dimension beams acquired by dividing each of the groups of vertical-dimension beams and each subgroup of horizontal-dimension beams acquired by dividing each of the groups of horizontal-dimension beams: and determining the first stage codebook $$W_1 = \begin{bmatrix} X_1 & 0 \\ 0 & X_2 \end{bmatrix}.$$

In a possible embodiment of the present disclosure, $X_2=X_1$, or
$X_2=[(X_{v,1}B_1) \otimes X_{h,1} (X_{v,2}B_2) \otimes X_{h,2} \ldots (X_{v,q}B_q) \otimes X_{h,q} \ldots (X_{v,Q}B_Q) \otimes X_{h,Q}]$,
or
$X_2=[X_{v,1} \otimes (X_{h,1}D_1) \ X_{v,2} \otimes (X_{h,2}D_2) \ldots X_{v,q} \otimes (X_{h,q}D_q) \ldots X_{v,Q} \otimes (X_{h,Q}D_Q)]$,
or
$X_2=[(X_{v,1}B_1) \otimes (X_{h,1}D_1) \ldots (X_{v,q}B_q) \otimes (X_{h,q}D_q) \ldots (X_{v,Q}B_Q) \otimes (X_{h,Q}D_Q)]$,
where $B_q$ represents a $m_q \times m_q$ diagonal matrix, $D_q$ represents a $l_q \times l_q$ diagonal matrix, $m_q$ represents the number of vertical-dimension beams included in the $q^{th}$ subgroup of vertical-dimension beams of the group $X_v$ of vertical-dimension beams, and $l_q$ represents the number of horizontal-dimension beams included in the $q^{th}$ subgroup of horizontal-dimension beams of the group $X_h$ of horizontal-dimension beams.

In a possible embodiment of the present disclosure, $B_q$ is determined in accordance with $X_{v,q}$ or $B_q$ is a predetermined value, and $D_q$ is determined in accordance with $X_{h,q}$ or $D_q$ is a predetermined value.

In another aspect, the present disclosure provides in some embodiments a precoding matrix determination device, including: a first processing module configured to determining vertical-dimension beam vectors and horizontal-dimension beam vectors, divide the vertical-dimension beam vectors into a plurality of groups of vertical-dimension beams, and divide the horizontal-dimension beam vectors into a plurality of groups of horizontal-dimension beams, every two adjacent groups of vertical-dimension beams including at least one vertical-dimension beam not overlapping the other vertical-dimension beams, and every two adjacent groups of horizontal-dimension beams including at least one horizontal-dimension beam not overlapping the other horizontal-dimension beams; a second processing module configured to divide each of the groups of vertical-dimension beams into a plurality of subgroups of vertical-dimension beams, and divide each of the groups of horizontal-dimension beams into a plurality of subgroups of horizontal-dimension beams, the number of the subgroups of vertical-dimension beams acquired by dividing any one of the groups of vertical-dimension beams being identical to the number of the subgroups of horizontal-dimension beams acquired by dividing any one of the groups of horizontal-dimension beams: a third processing module configured to determine a first stage codebook in accordance with a Kronecker product of each subgroup of vertical-dimension beams acquired by dividing each of the groups of vertical-dimension beams and each subgroup of horizontal-dimension beams acquired by dividing each of the groups of horizontal-dimension beams; and a fourth processing module configured to select a plurality of columns of beams from the determined first stage codebook using a second stage codebook, and perform phase adjustment to determine a precoding matrix.

In a possible embodiment of the present disclosure, each of the groups of vertical-dimension beams includes an identical number of vertical-dimension beams, and each of the groups of horizontal-dimension beams includes an identical number of horizontal-dimension beams.

In a possible embodiment of the present disclosure, the subgroups of vertical-dimension beams acquired by dividing each of the groups of vertical-dimension beams do not overlap each other, and the subgroups of horizontal-dimension beams acquired by dividing each of the groups of horizontal-dimension beams do not overlap each other.

In a possible embodiment of the present disclosure, the third processing module is further configured to: determine a first matrix $X_1=[X_{v,1} \otimes X_{h,1} \ X_{v,2} \otimes X_{h,2} \ldots X_{v,q} \otimes X_{h,q} \ldots X_{v,Q} \otimes X_{h,Q}]$ in accordance with the Kronecker product of each subgroup of vertical-dimension beams acquired by dividing each of the groups of vertical-dimension beams and each subgroup of horizontal-dimension beams acquired by dividing each of the groups of horizontal-dimension beams, where $X_{v,q}$ represents a $q^{th}$ subgroup of vertical-dimension beams of a group $X_v$ of vertical-dimension beams, and $X_{h,q}$ represents a $q^{th}$ subgroup of horizontal-dimension beams of a group $X_h$ of horizontal-dimension beams, determine a second matrix $X_2$ in accordance with each subgroup of vertical-dimension beams acquired by dividing each of the groups of vertical-dimension beams and each subgroup of horizontal-dimension beams acquired by dividing each of the groups of horizontal-dimension beams; and determine the first stage codebook $$W_1 = \begin{bmatrix} X_1 & 0 \\ 0 & X_2 \end{bmatrix}.$$

In a possible embodiment of the present disclosure, $X_2=X_1$, or $X_2=[(X_{v,1}B_1)\otimes X_{h,1}(X_{v,2}B_2)\otimes X_{h,2} \ldots (X_{v,q}B_q)\otimes X_{h,q} \ldots (X_{v,Q}B_Q)\otimes X_{h,Q}]$, or $X_2=[X_{v,1}\otimes(X_{h,1}D_1)\ X_{v,2}\otimes(X_{h,2}D_2) \ldots X_{v,q}\otimes(X_{h,q}D_q) \ldots X_{v,Q}\otimes(X_{h,Q}D_Q)]$, or $X_2=[(X_{v,1}B_1)\otimes(X_{h,1}D_1) \ldots (X_{v,q}B_q)\otimes(X_{h,q}D_q) \ldots (X_{v,Q}B_Q)\otimes(X_{h,Q}D_Q)]$, where $B_q$ represents a $m_q \times m_q$ diagonal matrix, $D_q$ represents a $l_q \times l_q$ diagonal matrix, $m_q$ represents the number of vertical-dimension beams included in the $q^{th}$ subgroup of vertical-dimension beams of the group $X_v$ of vertical-dimension beams, and $l_q$ represents the number of horizontal-dimension beams included in the $q^{th}$ subgroup of horizontal-dimension beams of the group $X_h$ of horizontal-dimension beams.

In a possible embodiment of the present disclosure, $B_q$ is determined in accordance with $X_{v,q}$ or $B_q$ is a predetermined value, and $D_q$ is determined in accordance with $X_{h,q}$ or $D_q$ is a predetermined value.

In yet another aspect, the present disclosure provides in some embodiments a precoding matrix determination device, including a processor and a memory. The processor is configured to read a program stored in the memory, so as to: determine vertical-dimension beam vectors and horizontal-dimension beam vectors, divide the vertical-dimension beam vectors into a plurality of groups of vertical-dimension beams, and divide the horizontal-dimension beam vectors into a plurality of groups of horizontal-dimension beams, every two adjacent groups of vertical-dimension beams including at least one vertical-dimension beam not overlapping the other vertical-dimension beams, and every two adjacent groups of horizontal-dimension beams including at least one horizontal-dimension beam not overlapping the other horizontal-dimension beams: divide each of the groups of vertical-dimension beams into a plurality of subgroups of vertical-dimension beams, and divide each of the groups of horizontal-dimension beams into a plurality of subgroups of horizontal-dimension beams, the number of the subgroups of vertical-dimension beams acquired by dividing any one of the groups of vertical-dimension beams being identical to the number of the subgroups of horizontal-dimension beams acquired by dividing any one of the groups of horizontal-dimension beams; determine a first stage codebook in accordance with a Kronecker product of each subgroup of vertical-dimension beams acquired by dividing each of the groups of vertical-dimension beams and each subgroup of horizontal-dimension beams acquired by dividing each of the groups of horizontal-dimension beams; and select a plurality of columns of beams from the determined first stage codebook using a second stage codebook, and perform phase adjustment so as to determine a precoding matrix.

According to the embodiments of the present disclosure, each of the groups of vertical-dimension beams is divided into the plurality of subgroups of vertical-dimension beams, and each of the groups of horizontal-dimension beams is divided into the plurality of subgroups of horizontal-dimension beams. Then, the first stage codebook is determined in accordance with the Kronecker product of each subgroup of vertical-dimension beams acquired by dividing each of the groups of vertical-dimension beams and each subgroup of horizontal-dimension beams acquired by dividing each of the groups of horizontal-dimension beams, so that the first stage codebook has a partial Kronecker product structure. As compared with a complete Kronecker product structure, it is able to reduce the number of beams included in the first stage codebook and reduce the feedback overhead for the second stage codebook.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In a codebook for a 3D MIMO antenna array in the related art, a second stage codebook is selected on the basis of a large number of codebooks in the case that a first stage codebook has a complete Kronecker product structure, and thereby a feedback overhead for the second stage codebook increases. To solve this problem, in the embodiments of the present disclosure, it determines that the first stage codebook meets a partial Kronecker product structure, so as to reduce the number of beams included in the first stage codebook.

In the embodiments of the present disclosure, a body for determining a precoding matrix may be a UE in accordance with an application scenario.

Figure 1:
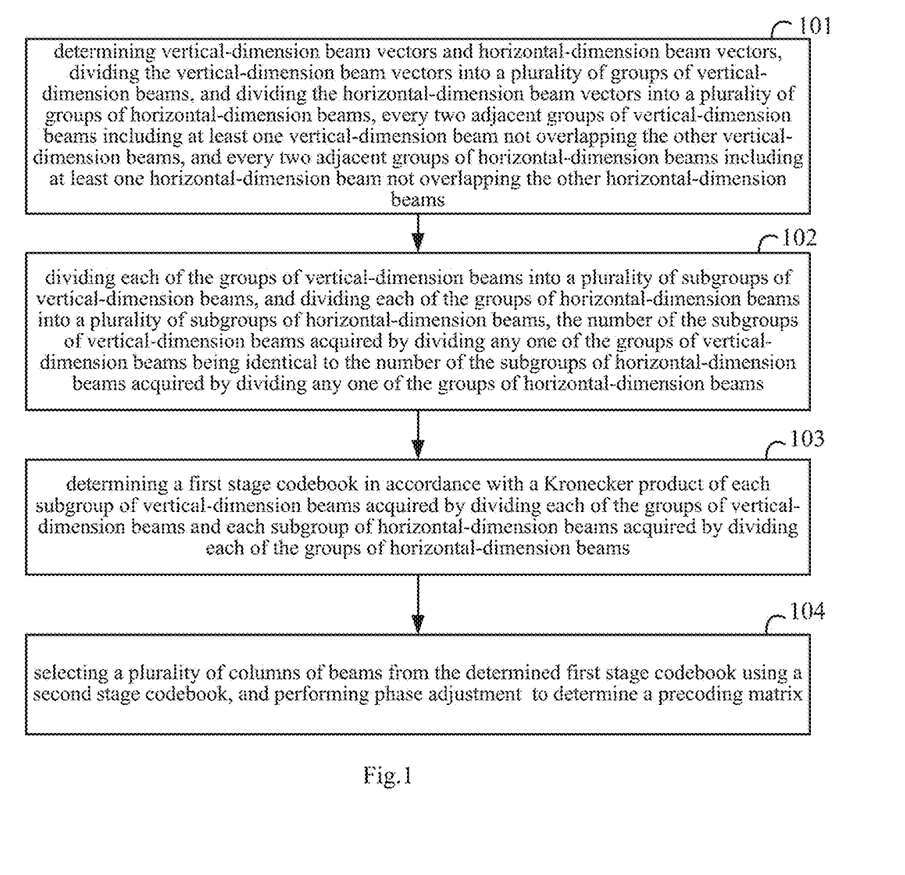
FIG. 1 is a flow chart of a precoding matrix determination method according to one embodiment of the present disclosure.

As shown in FIG. 1, the present disclosure provides in some embodiments a precoding matrix determination method, which includes the following steps.

Step 101: determining vertical-dimension beam vectors and horizontal-dimension beam vectors, dividing the vertical-dimension beam vectors into a plurality of groups of vertical-dimension beams, and dividing the horizontal-dimension beam vectors into a plurality of groups of horizontal-dimension beams. Every two adjacent groups of vertical-dimension beams include at least one vertical-dimension beam not overlapping the other vertical-dimension beams, and every two adjacent groups of horizontal-dimension beams include at least one horizontal-dimension beam not overlapping the other horizontal-dimension beams.

The vertical-dimension beam vectors are divided into a plurality of groups of vertical-dimension beams, and each of the groups of vertical-dimension beams includes an identical number of vertical-dimension beams. The horizontal-dimension beam vectors are divided into a plurality of groups of horizontal-dimension beams, and each of the groups of horizontal-dimension beams includes an identical number of horizontal-dimension beams.

Each of the vertical-dimension beam vector and the horizontal-dimension beam vector is generated in accordance with a DFT vector which may be pre-agreed by a base station and the UE, or determined by the base station in accordance with a notification message from the UE, or determined by the UE in accordance with a notification message from the base station.

To be specific, in the case that there are $N_v$ vertical-dimension beam vectors and $N_h$ horizontal-dimension beam vectors, the vertical-dimension beam vectors and the horizontal-dimension beam vectors may be divided as follows.

The $N_v$ vertical-dimension beam vectors may be divided into $S_v$ groups of vertical-dimension beams, and each of the groups of vertical-dimension beams may include $M_v$ beams. Beams in every two adjacent groups of vertical-dimension beams may partially overlap each other or may not overlap each other completely, i.e., every two adjacent groups of vertical-dimension beams include at least one beam not overlapping the other beams. In the case that the two adjacent groups of vertical-dimension beams include $N_{pv}$ beams not overlapping the other beams ($N_{pv} \geq 1$ and $N_{pv} \leq M_v$), a $(s_v)^{th}$ group of vertical-dimension beams may be expressed as an equation (1):

$$X_v^{(s_v)} = [v_{s_v \cdot N_{pv}}^v \ v_{s_v \cdot N_{pv}+1}^v \ \ldots \ v_{s_v \cdot N_{pv}+M_v-1}^v],$$

where $s_v = 0, 1, 2, \ldots, S_v-1$.

An $i^{th}$ vertical-dimension beam may be expressed as an equation (2):

$$v_i^v = \frac{1}{\sqrt{K_v}} \begin{bmatrix} 1 \\ e^{j\frac{2\pi}{N_v}i} \\ \vdots \\ e^{j\frac{2\pi}{N_v}(k-1)i} \\ \vdots \\ e^{j\frac{2\pi}{N_v}(K_v-1)i} \end{bmatrix},$$

where $K_v$ represents the number of ports of an antenna in a vertical dimension and in each polarization direction. Each of the groups of vertical-dimension beams is a $K_v \times M_v$ matrix.

In the case that an index of each vertical-dimension beam meets an inequation $s_v \cdot N_{pv} + m > N_v - 1$, the index may be re-calculated through a modulus operation, e.g., an equation (3):

$$\mathrm{mod}(s_v \cdot N_{pv}+m, N_v-1)-1,$$

where $\mathrm{mod}(m,n)$ represents a modulus operation of m over n.

Identically, the $N_h$ horizontal-dimension beam vectors may be divided into $S_h$ groups of horizontal-dimension beams, and each of the groups of horizontal-dimension beams may include $M_h$ beams. Beams in every two adjacent groups of horizontal-dimension beams may partially overlap each other or may not overlap each other completely, i.e., every two adjacent groups of horizontal-dimension beams include at least one beam not overlapping the other beams. In the case that the two adjacent groups of horizontal-dimension beams include $N_{ph}$ beams not overlapping the other beams ($N_{ph} \geq 1$ and $N_{ph} \leq M_h$), a $(s_h)^{th}$ group of horizontal-dimension beams may be expressed as an equation (4):

$$X_h^{(s_h)} = [v_{s_h \cdot N_{ph}}^h \ v_{s_h \cdot N_{ph}+1}^h \ \ldots \ v_{s_h \cdot N_{ph}+M_h-1}^h].$$

An $i^{th}$ horizontal-dimension beam may be expressed as an equation (5):

$$v_i^h = \frac{1}{\sqrt{K_h}} \begin{bmatrix} 1 \\ e^{j\frac{2\pi}{N_h}i} \\ \vdots \\ e^{j\frac{2\pi}{N_h}(k-1)i} \\ \vdots \\ e^{j\frac{2\pi}{N_h}(K_h-1)i} \end{bmatrix},$$

where $K_h$ represents the number of ports of each antenna in a horizontal dimension and in each polarization direction. Each of the groups of horizontal-dimension beams is a $K_h \times M_h$ matrix.

In the case that an index of each horizontal-dimension beam meets an inequation $s_h \cdot N_{ph} + m > N_h - 1$, it may be re-calculated through a modulus operation, e.g., an equation (6):

$$\mathrm{mod}(s_h \cdot N_{ph}+m, N_h-1)-1.$$

Step 102: dividing each of the groups of vertical-dimension beams into a plurality of subgroups of vertical-dimension beams, and dividing each of the groups of horizontal-dimension beams into a plurality of subgroups of horizontal-dimension beams. The number of the subgroups of vertical-dimension beams acquired by dividing any one of the groups of vertical-dimension beams is identical to the number of the subgroups of horizontal-dimension beams acquired by dividing any one of the groups of horizontal-dimension beams.

During the implementation, the subgroups of vertical-dimension beams acquired by dividing each of the groups of vertical-dimension beams do not overlap each other, and the subgroups of horizontal-dimension beams acquired by dividing each of the groups of horizontal-dimension beams do not overlap each other.

Taking the $(s_v)^{th}$ group of vertical-dimension beams as an example, the $M_v$ beams included in the group of vertical-dimension beams may be further divided into Q subgroups of vertical-dimension beams. At this time, the group of vertical-dimension beams may be expressed as an equation (7)

$$X_v^{(s_v)} = [X_{v,1}^{(s_v)} X_{v,2}^{(s_v)} \ldots X_{v,q}^{(s_v)} \ldots X_{v,Q}^{(s_v)}].$$

In the case that a $q^{th}$ subgroup of vertical-dimension beams includes $m_q$ beams, $$\sum_{q=1}^{Q} m_q = M_v.$$

The $q^{th}$ subgroup of vertical-dimension beams may be expressed as an equation (8):

$$X_{v,q}^{(s_v)} = [v_{s_v \cdot N_{pv}+m_1+\ldots+m_{q-1}}^v \ v_{s_v \cdot N_{pv}+m_1+\ldots+m_{q-1}+1}^v \\ v_{s_v \cdot N_{pv}+m_1+\ldots+m_{q-1}+m_q-1}^v].$$

This subgroup of vertical-dimension beams is a $K_v \times m_q$ matrix.

Similarly, the $M_h$ beams included in each of the groups of horizontal-dimension beams may be further divided into Q subgroups of horizontal-dimension beams, and this group of horizontal-dimension beams may be expressed as an equation (9):

$$X_h^{(s_h)} = [X_{h,1}^{(s_h)} X_{h,2}^{(s_h)} \ldots X_{h,q}^{(s_h)} \ldots X_{h,Q}^{(s_h)}].$$

In the case that a subgroup $q^{th}$ of horizontal-dimension beams includes $l_q$ beams.

$$\sum_{q=1}^{Q} l_q = M_h.$$

The $q^{th}$ subgroup of horizontal-dimension beams may be expressed as an equation (10):

$$X_{h,q}^{(s_h)} = [v_{s_h \cdot N_{ph} + l_1 + \ldots + l_{q-1}}^h \, v_{s_h \cdot N_{ph} + l_1 + \ldots + l_{q-1} + 1}^h \ldots v_{s_h \cdot N_{ph} + l_1 + \ldots + l_{q-1} + l_q - 1}^h]$$

This subgroup of horizontal-dimension beams is a $K_h \times l_q$ matrix.

Step 103: determining a first stage codebook in accordance with a Kronecker product of each subgroup of vertical-dimension beams acquired by dividing each of the groups of vertical-dimension beams and each subgroup of horizontal-dimension beams acquired by dividing each of the groups of horizontal-dimension beams.

In the embodiments of the present disclosure, the first stage codebook meets a partial Kronecker product structure.

In a possible embodiment of the present disclosure, the step of determining the first stage codebook may include: select a Kronecker product of each subgroup of vertical-dimension beams acquired by dividing each of the groups of vertical-dimension beams and each subgroup of horizontal-dimension beams acquired by dividing each of the groups of horizontal-dimension beams to determine a first matrix expressed by a following equation (11):

$$X_1 = [X_{v,1} \otimes X_{h,1} \; X_{v,2} \otimes X_{h,2} \ldots X_{v,q} \otimes X_{h,q} \ldots X_{v,Q} \otimes X_{h,Q}]$$

in accordance with the Kronecker product of each subgroup of vertical-dimension beams acquired by dividing each of the groups of vertical-dimension beams and each subgroup of horizontal-dimension beams acquired by dividing each of the groups of horizontal-dimension beams, where $X_{v,q}$ represents a $q^{th}$ subgroup of vertical-dimension beams of a group $X_v$ of vertical-dimension beams, $X_{h,q}$ represents a $q^{th}$ subgroup of horizontal-dimension beams of a group $X_h$ of horizontal-dimension beams, and the first matrix includes $$\sum_{q=1}^{Q} m_q l_q$$

columns and $K_v \times K_h$ rows; determining a second matrix $X_2$ in accordance with each subgroup of vertical-dimension beams acquired by dividing each of the groups of vertical-dimension beams and each subgroup of horizontal-dimension beams acquired by dividing each of the groups of horizontal-dimension beams, where the second matrix includes $$\sum_{q=1}^{Q} m_q l_q$$

columns and $K_v \times K_h$ rows; and determining the first stage codebook $$W_1 = \begin{bmatrix} X_1 & 0 \\ 0 & X_2 \end{bmatrix}. \tag{12}$$

During the implementation, a Kronecker product of each subgroup of vertical-dimension beams acquired by dividing one group of vertical-dimension beams and each subgroup of horizontal-dimension beams acquired by dividing one group of horizontal-dimension beams may be selected in accordance with a channel condition, so as to determine the first matrix.

The second matrix is determined in accordance with each subgroup of vertical-dimension beams acquired by dividing each of the groups of vertical-dimension beams and each of the groups of horizontal-dimension beams acquired by dividing each of the groups of horizontal-dimension beams corresponding to the first matrix. The second matrix may be, but not limited to, expressed as an equation (13) of $X_2 = X_1$ an equation (14) of $$X_2 = [(X_{v,1} B_1) \otimes X_{h,1} (X_{v,2} B_2) \otimes X_{h,2} \ldots (X_{v,q} B_q) \otimes X_{h,q} \ldots (X_{v,Q} B_Q) \otimes X_{h,Q}],$$

or an equation (15) of $$X_2 = [X_{v,1} \otimes (X_{h,1} D_1) X_{v,2} \otimes (X_{h,2} D_2) \ldots X_{v,q} \otimes (X_{h,q} D_q) \ldots X_{v,Q} \otimes (X_{h,Q} D_Q)],$$

or an equation (16) of $$X_2 = [(X_{v,1} B_1) \otimes (X_{h,1} D_1) \ldots (X_{v,q} B_q) \otimes (X_{h,q} D_q) \ldots (X_{v,Q} B_Q) \otimes (X_{h,Q} D_Q)],$$

where $B_q$ represents a $m_q \times m_q$ diagonal matrix, $D_q$ represents a $l_q \times l_q$ diagonal matrix, $m_q$ represents the number of vertical-dimension beams included in the $q^{th}$ subgroup of vertical-dimension beams of the group $X_v$ of vertical-dimension beams, and $l_q$ represents the number of horizontal-dimension beams included in the $q^{th}$ subgroup of horizontal-dimension beams of the group $X_h$ of horizontal-dimension beams.

During the implementation, $B_q$ is determined in accordance with $X_{v,q}$ or $B_q$ is a predetermined value, and $D_q$ is determined in accordance with $X_{h,q}$ or $D_q$ is a predetermined value.

Based on the above expression of the first stage codebook $W_1$, the first stage codebook has a partial Kronecker product structure, and each diagonal block includes $$\sum_{q=1}^{Q} m_q l_q$$

columns, i.e., each $W_1$ includes $$\sum_{q=1}^{Q} m_q l_q$$

beams. In the case that the first stage codebook has a complete Kronecker product structure, each $W_1$ may include $$\sum_{q=1}^{Q} m_q \cdot \sum_{q=1}^{Q} l_q$$

beams. Hence, through the partial Kronecker product structure, it is able to reduce the number of the beams in the first stage codebook, thereby to reduce the number of codebooks based on which the second stage codebook is selected and reduce the feedback overhead for the second stage codebook.

Step 104: selecting a plurality of columns of beams from the determined first stage codebook using a second stage codebook, and performing phase adjustment so as to determine a precoding matrix.

The present disclosure does not focus on the second stage codebook, i.e., the second stage codebook may be predetermined or calculated using a known method in the related art in accordance with the practical need.

For the second stage codebook, each direction in each column is a unit vector. In a possible embodiment of the present disclosure, the second stage codebook has a partial Kronecker product structure.

In a possible embodiment of the present disclosure, the second stage codebook may be expressed as an equation (17):

$$W_2 = \begin{bmatrix} Y_1 & Y_2 & \ldots & Y_r \\ \alpha_1 Y_1 & \alpha_2 Y_2 & \ldots & \alpha_r Y_r \end{bmatrix},$$

where $Y_i$ represents a column selection vector having a length of $$\sum_{q=1}^{Q} m_q l_q$$

(i.e., $Y_i$ has one and only one element "1", and the other elements are all "0", so as to facilitate the selection of one column from a diagonal block of $W_1$), $\alpha_i$ is used to perform the phase adjustment between two groups of polarization antennae and $$\alpha_i \in \left\{ e^{j\frac{2\pi t}{T}}, t = 0, 1, \ldots T-1 \right\},$$

$W_2$ represents a matrix having $$\left( 2 \cdot \sum_{q=1}^{Q} m_q l_q \right) \times r$$

dimensions, and r represents the number of columns (also called ranks) of the precoding matrix.

Figure 2:
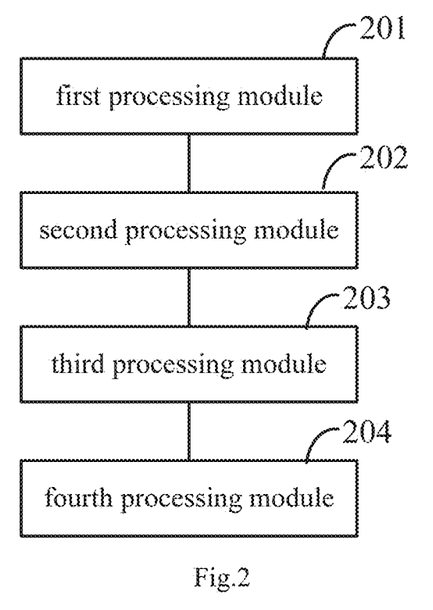
FIG. 2 is a schematic view showing a precoding matrix determination device according to one embodiment of the present disclosure.

Based on an identical inventive concept, the present disclosure further provides in some embodiments a precoding matrix determination device. The implementation of the precoding matrix determination device may refer to that of the precoding matrix determination method, and thus will not be particularly defined herein. As shown in FIG. 2, the precoding matrix determination device may include: a first processing module 201 configured to determining vertical-dimension beam vectors and horizontal-dimension beam vectors, divide the vertical-dimension beam vectors into a plurality of groups of vertical-dimension beams, and divide the horizontal-dimension beam vectors into a plurality of groups of horizontal-dimension beams, every two adjacent groups of vertical-dimension beams including at least one vertical-dimension beam not overlapping the other vertical-dimension beams, and every two adjacent groups of horizontal-dimension beams including at least one horizontal-dimension beam not overlapping the other horizontal-dimension beams; a second processing module 202 configured to divide each of the groups of vertical-dimension beams into a plurality of subgroups of vertical-dimension beams, and divide each of the groups of horizontal-dimension beams into a plurality of subgroups of horizontal-dimension beams, the number of the subgroups of vertical-dimension beams acquired by dividing any one of the groups of vertical-dimension beams being identical to the number of the subgroups of horizontal-dimension beams acquired by dividing any one of the groups of horizontal-dimension beams; a third processing module 203 configured to determine a first stage codebook in accordance with a Kronecker product of each subgroup of vertical-dimension beams acquired by dividing each of the groups of vertical-dimension beams and each subgroup of horizontal-dimension beams acquired by dividing each of the groups of horizontal-dimension beams; and a fourth processing module 204 configured to select a plurality of columns of beams from the determined first stage codebook using a second stage codebook, and perform phase adjustment so as to determine a precoding matrix.

During the implementation, each of the groups of vertical-dimension beams includes an identical number of vertical-dimension beams, and each of the groups of horizontal-dimension beams includes an identical number of horizontal-dimension beams.

During the implementation, the subgroups of vertical-dimension beams acquired by dividing each of the groups of vertical-dimension beams do not overlap each other, and the subgroups of horizontal-dimension beams acquired by dividing each of the groups of horizontal-dimension beams do not overlap each other.

During the implementation, the third processing module 203 is further configured to: determine a first matrix $X_1 = [X_{v,1} \otimes X_{h,1} \ X_{v,2} \otimes X_{h,2} \ldots X_{v,q} \otimes X_{h,q} \ldots X_{v,Q} \otimes X_{h,Q}]$ in accordance with the Kronecker product of each subgroup of vertical-dimension beams acquired by dividing each of the groups of vertical-dimension beams and each subgroup of horizontal-dimension beams acquired by dividing each of the groups of horizontal-dimension beams, where $X_{v,q}$ represents a $q^{th}$ subgroup of vertical-dimension beams of a group $X_v$ of vertical-dimension beams, and $X_{h,q}$ represents a $q^{th}$ subgroup of horizontal-dimension beams of a group $X_h$ of horizontal-dimension beams; determine a second matrix $X_2$ in accordance with each subgroup of vertical-dimension beams acquired by dividing each of the groups of vertical-dimension beams and each subgroup of horizontal-dimension beams acquired by dividing each of the groups of horizontal-dimension beams, and determine the first stage codebook $$W_1 = \begin{bmatrix} X_1 & 0 \\ 0 & X_2 \end{bmatrix}.$$

In a possible embodiment of the present disclosure, $X_2 = X_1$, or
$X_2 = [(X_{v,1}B_1) \otimes X_{h,1} \ (X_{v,2}B_2) \otimes X_{h,2} \ldots (X_{v,q}B_q) \otimes X_{h,q} \ldots (X_{v,Q}B_Q) \otimes X_{h,Q}],$ or $X_2=[X_{v,1}\otimes(X_{h,1}D_1)X_{v,2}\otimes(X_{h,2}D_2)\ldots X_{v,q}\otimes(X_{h,q}D_q)\ldots X_{v,Q}\otimes(X_{h,Q}D_Q)]$, or $X_2=[(X_{v,1}B_1)\otimes(X_{h,1}D_1)\ldots(X_{v,q}B_q)\otimes(X_{h,q}D_q)\ldots(X_{v,Q}B_Q)\otimes(X_{h,Q}D_Q)]$, where $B_q$ represents a $m_q \times m_q$ diagonal matrix, $D_q$ represents a $l_q \times l_q$ diagonal matrix, $m_q$ represents the number of vertical-dimension beams included in the $q^{th}$ subgroup of vertical-dimension beams of the group $X_v$ of vertical-dimension beams, and $l_q$ represents the number of horizontal-dimension beams included in the $q^{th}$ subgroup of horizontal-dimension beams of the group $X_h$ of horizontal-dimension beams.

In a possible embodiment of the present disclosure, $B_q$ is determined in accordance with $X_{v,q}$ or $B_q$ is a predetermined value, and $D_q$ is determined in accordance with $X_{h,q}$ or $D_q$ is a predetermined value.

Figure 3:
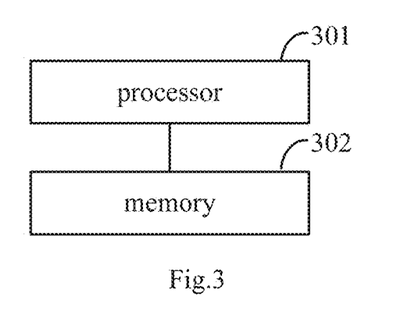
FIG. 3 is a schematic view showing a precoding matrix determination device according to one embodiment of the present disclosure.

Based on an identical inventive concept, the present disclosure further provides in some embodiments a device. The implementation of the device may refer to that of the precoding matrix determination method, and thus will not be particularly defined herein. As shown in FIG. 3, the device includes a processor 301 and a memory 302 configured to store therein a predetermined program. The processor 301 is configured to read the program stored in the memory 302, so as to: determine vertical-dimension beam vectors and horizontal-dimension beam vectors, divide the vertical-dimension beam vectors into a plurality of groups of vertical-dimension beams, and divide the horizontal-dimension beam vectors into a plurality of groups of horizontal-dimension beams, every two adjacent groups of vertical-dimension beams including at least one vertical-dimension beam not overlapping the other vertical-dimension beams, and every two adjacent groups of horizontal-dimension beams including at least one horizontal-dimension beam not overlapping the other horizontal-dimension beams; divide each of the groups of vertical-dimension beams into a plurality of subgroups of vertical-dimension beams, and divide each of the groups of horizontal-dimension beams into a plurality of subgroups of horizontal-dimension beams, the number of the subgroups of vertical-dimension beams acquired by dividing any one of the groups of vertical-dimension beams being identical to the number of the subgroups of horizontal-dimension beams acquired by dividing any one of the groups of horizontal-dimension beams; determine a first stage codebook in accordance with a Kronecker product of each subgroup of vertical-dimension beams acquired by dividing each of the groups of vertical-dimension beams and each subgroup of horizontal-dimension beams acquired by dividing each of the groups of horizontal-dimension beams; and select a plurality of columns of beams from the determined first stage codebook using a second stage codebook, and perform phase adjustment so as to determine a precoding matrix.

In a possible embodiment of the present disclosure, each of the groups of vertical-dimension beams includes an identical number of vertical-dimension beams, and each of the groups of horizontal-dimension beams includes an identical number of horizontal-dimension beams.

In a possible embodiment of the present disclosure, the subgroups of vertical-dimension beams acquired by dividing each of the groups of vertical-dimension beams do not overlap each other, and the subgroups of horizontal-dimension beams acquired by dividing each of the groups of horizontal-dimension beams do not overlap each other.

In a possible embodiment of the present disclosure, the processor 301 is further configured to: determine a first matrix $X_1=[X_{v,1}\otimes X_{h,1}\ X_{v,2}\otimes X_{h,2}\ldots X_{v,q}\otimes X_{h,q}\ldots X_{v,Q}\otimes X_{h,Q}]$ in accordance with the Kronecker product of each subgroup of vertical-dimension beams acquired by dividing each of the groups of vertical-dimension beams and each subgroup of horizontal-dimension beams acquired by dividing each of the groups of horizontal-dimension beams, where $X_{v,q}$ represents a $q^{th}$ subgroup of vertical-dimension beams of a group $X_v$ of vertical-dimension beams, and $X_{h,q}$ represents a $q^{th}$ subgroup of horizontal-dimension beams of a group $X_h$ of horizontal-dimension beams; determine a second matrix $X_2$ in accordance with each subgroup of vertical-dimension beams acquired by dividing each of the groups of vertical-dimension beams and each subgroup of horizontal-dimension beams acquired by dividing each of the groups of horizontal-dimension beams, and determine the first stage codebook $$W_1 = \begin{bmatrix} X_1 & 0 \\ 0 & X_2 \end{bmatrix}.$$

In a possible embodiment of the present disclosure, $X_2=X_1$, or $X_2=[(X_{v,1}B_1)\otimes X_{h,1}(X_{v,2}B_2)\otimes X_{h,2}\ldots(X_{v,q}B_q)\otimes X_{h,q}\ldots(X_{v,Q}B_Q)\otimes X_{h,Q}]$, or $X_2=[X_{v,1}\otimes(X_{h,1}D_1)X_{v,2}\otimes(X_{h,2}D_2)\ldots X_{v,q}\otimes(X_{h,q}D_q)\ldots X_{v,Q}\otimes(X_{h,Q}D_Q)]$, or $X_2=[(X_{v,1}B_1)\otimes(X_{h,1}D_1)\ldots(X_{v,q}B_q)\otimes(X_{h,q}D_q)\ldots(X_{v,Q}B_Q)\otimes(X_{h,Q}D_Q)]$, where $B_q$ represents a $m_q \times m_q$ diagonal matrix, $D_q$ represents a $l_q \times l_q$ diagonal matrix, $m_q$ represents the number of vertical-dimension beams included in the $q^{th}$ subgroup of vertical-dimension beams of the group $X_v$ of vertical-dimension beams, and $l_q$ represents the number of horizontal-dimension beams included in the $q^{th}$ subgroup of horizontal-dimension beams of the group $X_h$ of horizontal-dimension beams.

In a possible embodiment of the present disclosure, $B_q$ is determined in accordance with $X_{v,q}$ or $B_q$ is a predetermined value, and $D_q$ is determined in accordance with $X_{h,q}$ or $D_q$ is a predetermined value.

According to the embodiments of the present disclosure, each of the groups of vertical-dimension beams is divided into the plurality of subgroups of vertical-dimension beams, and each of the groups of horizontal-dimension beams is divided into the plurality of subgroups of horizontal-dimension beams. Then, the first stage codebook is determined in accordance with the Kronecker product of each subgroup of vertical-dimension beams acquired by dividing each of the groups of vertical-dimension beams and each subgroup of horizontal-dimension beams acquired by dividing each subgroup of horizontal-dimension beams, so that the first stage codebook has a partial Kronecker product structure. As compared with a complete Kronecker product structure, it is able to reduce the number of beams included in the first stage codebook and reduce the feedback overhead for the second stage codebook.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction device which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Obviously, a person skilled in the art may make further modifications and improvements without departing from the spirit of the present disclosure, and these modifications and improvements shall also fall within the scope of the present disclosure.

What is claimed is:

1. A data transmission method, comprising:
   determining vertical-dimension beam vectors and horizontal-dimension beam vectors, dividing the vertical-dimension beam vectors into a plurality of groups of vertical-dimension beams, and dividing the horizontal-dimension beam vectors into a plurality of groups of horizontal-dimension beams, every two adjacent groups of vertical-dimension beams comprising at least one vertical-dimension beam not overlapping the other vertical-dimension beams, and every two adjacent groups of horizontal-dimension beams comprising at least one horizontal-dimension beam not overlapping the other horizontal-dimension beams;
   dividing each of the groups of vertical-dimension beams into a plurality of subgroups of vertical-dimension beams, and dividing each of the groups of horizontal-dimension beams into a plurality of subgroups of horizontal-dimension beams, the number of the subgroups of vertical-dimension beams acquired by dividing any one of the groups of vertical-dimension beams being identical to the number of the subgroups of horizontal-dimension beams acquired by dividing any one of the groups of horizontal-dimension beams;
   determining a first stage codebook in accordance with a Kronecker product of each of the subgroups of vertical-dimension beams acquired by dividing each of the groups of vertical-dimension beams and each of the subgroups of horizontal-dimension beams acquired by dividing each of the groups of horizontal-dimension beams;
   selecting a plurality of columns of beams from the determined first stage codebook using a second stage codebook, and performing phase adjustment on the selected plurality of columns of beams to determine a precoding matrix; and
   transmitting data using the determined precoding matrix.

2. The data transmission method according to claim 1, wherein each of the groups of vertical-dimension beams comprises an identical number of vertical-dimension beams, and each of the groups of horizontal-dimension beams comprises an identical number of horizontal-dimension beams.

3. The data transmission method according to claim 2, wherein the subgroups of vertical-dimension beams acquired by dividing each of the groups of vertical-dimension beams do not overlap each other, and the subgroups of horizontal-dimension beams acquired by dividing each of the groups of horizontal-dimension beams do not overlap each other.

4. The data transmission method according to claim 3, wherein the step of determining the first stage codebook in accordance with the Kronecker product of each of the subgroups of vertical-dimension beams acquired by dividing each of the groups of vertical-dimension beams and each of the subgroups of horizontal-dimension beams acquired by dividing each of the groups of horizontal-dimension beams comprises:
   determining a first matrix $X_1 = [X_{v,1} \otimes X_{h,1} \ X_{v,2} \otimes X_{h,2} \ L \ X_{v,q} \otimes X_{h,q} \ L \ X_{v,Q} \otimes X_{h,Q}]$ in accordance with the Kronecker product of each of the subgroups of vertical-dimension beams acquired by dividing each of the groups of vertical-dimension beams and each of the subgroups of horizontal-dimension beams acquired by dividing each of the groups of horizontal-dimension beams, where $X_{v,q}$ represents a $q^{th}$ subgroup of vertical-dimension beams of a group $X_v$ of vertical-dimension beams, and $X_{h,q}$ represents a $q^{th}$ subgroup of horizontal-dimension beams of a group $X_h$ of horizontal-dimension beams;
   determining a second matrix $X_2$ in accordance with each of the subgroups of vertical-dimension beams acquired by dividing each of the groups of vertical-dimension beams and each of the subgroups of horizontal-dimension beams acquired by dividing each of the groups of horizontal-dimension beams; and
   determining the first stage codebook $$W_1 = \begin{bmatrix} X_1 & 0 \\ 0 & X_2 \end{bmatrix}.$$

5. The data transmission method according to claim 4, wherein
   $X_2 = X_1$, or
   $X_2 = [(X_{v,1}B_1) \otimes X_{h,1} \ (X_{v,2}B_2) \otimes X_{h,2} \ L \ (X_{v,q}B_q) \otimes X_{h,q} \ L \ (X_{v,Q}B_Q) \otimes X_{h,Q}]$, or
   $X_2 = [X_{v,1} \otimes (X_{h,1}D_1) \ X_{v,2} \otimes (X_{h,2}D_2) \ L \ X_{v,q} \otimes (X_{h,q}D_q) \ L \ X_{v,Q} \otimes (X_{h,Q}D_Q)]$, or
   $X_2 = [(X_{v,1}B_1) \otimes (X_{h,1}D_1) \ L \ (X_{v,q}B_q) \otimes (X_{h,q}D_q) \ L \ (X_{v,Q}B_Q) \otimes (X_{h,Q}D_Q)]$, where $B_q$ represents a $m_q \times m_q$ diagonal matrix, $D_q$ represents a $l_q \times l_q$ diagonal matrix, $m_q$ represents the number of vertical-dimension beams comprised in the $q^{th}$ subgroup of vertical-dimension beams of the group $X_v$ of vertical-dimension beams, and $l_q$ represents the number of horizontal-dimension beams comprised in the $q^{th}$ subgroup of horizontal-dimension beams of the group $X_h$ of horizontal-dimension beams.

6. The data transmission method according to claim 5, wherein $B_q$ is determined in accordance with $X_{v,q}$ or $B_q$ is a predetermined value, and $D_q$ is determined in accordance with $X_{h,q}$ or $D_q$ is a predetermined value.

7. A data transmission device, comprising a processor and a memory, wherein the processor is configured to read a program stored in the memory to:

determine vertical-dimension beam vectors and horizontal-dimension beam vectors, divide the vertical-dimension beam vectors into a plurality of groups of vertical-dimension beams, and divide the horizontal-dimension beam vectors into a plurality of groups of horizontal-dimension beams, every two adjacent groups of vertical-dimension beams comprising at least one vertical-dimension beam not overlapping the other vertical-dimension beams, and every two adjacent groups of horizontal-dimension beams comprising at least one horizontal-dimension beam not overlapping the other horizontal-dimension beams;

divide each of the groups of vertical-dimension beams into a plurality of subgroups of vertical-dimension beams, and divide each of the groups of horizontal-dimension beams into a plurality of subgroups of horizontal-dimension beams, the number of the subgroups of vertical-dimension beams acquired by dividing any one of the groups of vertical-dimension beams being identical to the number of the subgroups of horizontal-dimension beams acquired by dividing any one of the groups of horizontal-dimension beams;

determine a first stage codebook in accordance with a Kronecker product of each of the subgroups of vertical-dimension beams acquired by dividing each of the groups of vertical-dimension beams and each of the subgroups of horizontal-dimension beams acquired by dividing each of the groups of horizontal-dimension beams;

select a plurality of columns of beams from the determined first stage codebook using a second stage codebook, and perform phase adjustment on the selected plurality of columns of beams to determine a precoding matrix; and transmit data using the determined preceding matrix.

8. The data transmission device according to claim 7, wherein each of the groups of vertical-dimension beams comprises an identical number of vertical-dimension beams, and each of the groups of horizontal-dimension beams comprises an identical number of horizontal-dimension beams.

9. The data transmission device according to claim 8, wherein the subgroups of vertical-dimension beams acquired by dividing each of the groups of vertical-dimension beams do not overlap each other, and the subgroups of horizontal-dimension beams acquired by dividing each of the groups of horizontal-dimension beams do not overlap each other.

10. The data transmission device according to claim 9, wherein the processor is further configured to read the program stored in the memory to:

determine a first matrix $X_1 = [X_{v,1} \otimes X_{h,1} \ X_{v,2} \otimes X_{h,2} \ L \ X_{v,q} \otimes X_{h,q} \ L \ X_{v,Q} \otimes X_{h,Q}]$ in accordance with the Kronecker product of each of the subgroups of vertical-dimension beams acquired by dividing each of the groups of vertical-dimension beams and each of the subgroups of horizontal-dimension beams acquired by dividing each of the groups of horizontal-dimension beams, where $X_{v,q}$ represents a $q^{th}$ subgroup of vertical-dimension beams of a group $X_v$ of vertical-dimension beams, and $X_{h,q}$ represents a $q^{th}$ subgroup of horizontal-dimension beams of a group $X_h$ of horizontal-dimension beams;

determine a second matrix $X_2$ in accordance with each of the subgroups of vertical-dimension beams acquired by dividing each of the groups of vertical-dimension beams and each of the subgroups of horizontal-dimension beams acquired by dividing each of the groups of horizontal-dimension beams; and determine the first stage codebook $$W_1 = \begin{bmatrix} X_1 & 0 \\ 0 & X_2 \end{bmatrix}.$$

11. The data transmission device according to claim 10, wherein $X_2 = X_1$, or $X_2 = [(X_{v,1} B_1) \otimes X_{h,1} \ (X_{v,2} B_2) \otimes X_{h,2} \ L \ (X_{v,q} B_q) \otimes X_{h,q} \ L \ (X_{v,Q} B_Q) \otimes X_{h,Q}]$, or $X_2 = [X_{v,1} \otimes (X_{h,1} D_1) \ X_{v,2} \otimes (X_{h,2} D_2) \ L \ X_{v,q} \otimes (X_{h,q} D_q) \ L \ X_{v,Q} \otimes (X_{h,Q} D_Q)]$, or $X_2 = [(X_{v,1} B_1) \otimes (X_{h,1} D_1) \ L \ (X_{v,q} B_q) \otimes (X_{h,q} D_q) \ L \ (X_{v,Q} B_Q) \otimes (X_{h,Q} D_Q)]$, where $B_q$ represents a $m_q \times m_q$ diagonal matrix, $D_q$ represents a $l_q \times l_q$ diagonal matrix, $m_q$ represents the number of vertical-dimension beams comprised in the $q^{th}$ subgroup of vertical-dimension beams of the group $X_v$ of vertical-dimension beams, and $l_q$ represents the number of horizontal-dimension beams comprised in the $q^{th}$ subgroup of horizontal-dimension beams of the group $X_h$ of horizontal-dimension beams.

12. The data transmission device according to claim 11, wherein $B_q$ is determined in accordance with $X_{v,q}$ or $B_q$ is a predetermined value, and $D_q$ is determined in accordance with $X_{h,q}$ or $D_q$ is a predetermined value.

* * * * *